United States Patent [19]

Diekevers

[11] Patent Number: 5,040,855
[45] Date of Patent: Aug. 20, 1991

[54] ISOLATED RIM ROLLER ASSEMBLY
[75] Inventor: Mark S. Diekevers, East Peoria, Ill.
[73] Assignee: Caterpillar Inc., Peoria, Ill.
[21] Appl. No.: 575,759
[22] Filed: Aug. 31, 1990
[51] Int. Cl.$^5$ .............................. B62D 55/14
[52] U.S. Cl. ........................... 305/24; 305/21
[58] Field of Search ............ 305/21, 23, 24, 25, 305/27, 28; 295/7, 8, 11; 152/5, 7, 17, 40, 47

[56] References Cited

U.S. PATENT DOCUMENTS

| Re. 30,039 | 6/1979 | Clemens et al. | 305/21 |
|---|---|---|---|
| 2,033,862 | 3/1936 | Piron | 295/11 |
| 2,647,025 | 7/1953 | Deffenbaugh | 308/187.1 |
| 2,667,767 | 2/1954 | Burrell | 295/11 X |
| 2,804,358 | 8/1957 | Eriksson | 308/184 |
| 2,923,570 | 2/1960 | Jorn et al. | 295/11 |
| 3,127,211 | 3/1964 | Kordes et al. | 295/11 |
| 3,147,048 | 9/1964 | Johnson et al. | 308/18 |
| 3,580,093 | 5/1971 | Tamizawa | 74/230.3 |
| 3,764,184 | 10/1973 | Orr et al. | 305/25 |
| 3,797,895 | 3/1974 | Tamizawa | 305/27 |
| 3,910,128 | 10/1975 | Boggs et al. | 74/230.01 |
| 3,996,810 | 12/1976 | Groff | 74/230.3 |
| 4,818,041 | 4/1989 | Oertley | 305/56 |
| 4,890,892 | 1/1990 | Haslett | 305/25 |

*Primary Examiner*—Russell D. Stormer
*Attorney, Agent, or Firm*—Claude F. White

[57] ABSTRACT

An isolated rim roller assembly guides and supports portions of the endless track of a track-type vehicle as that portion of the track travels between a drive wheel and an idler wheel of the vehicle. The metallic rims of the roller assembly are isolated from the roller shell by cushioning rings which are bonded to the rims and the roller shell. Noise and vibration generated by the metal to metal contact between the endless track and the rims is isolated from the remainder of the roller assembly by the cushioning rings. Conventional track supporting rollers have metal tread portions which generated objectionable noise and impact between the track and the treads. The subject roller assembly, with the isolated rims, reduces the noise and impact levels.

6 Claims, 2 Drawing Sheets

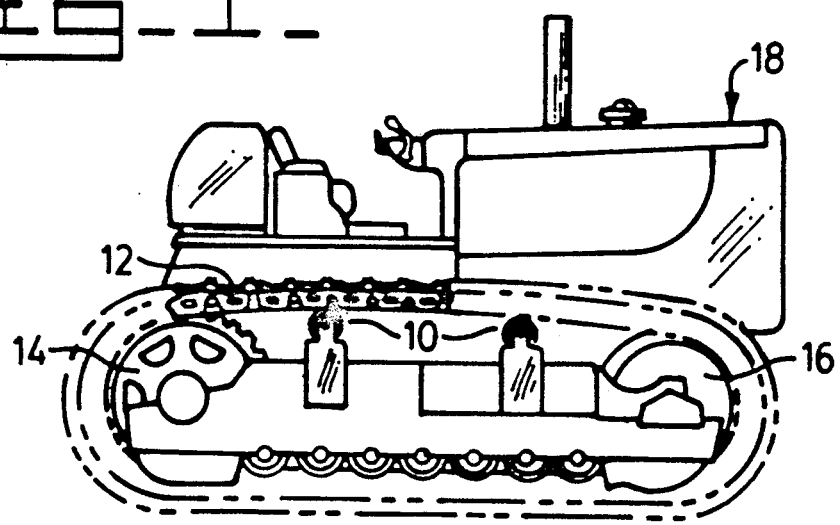
Fig_1_
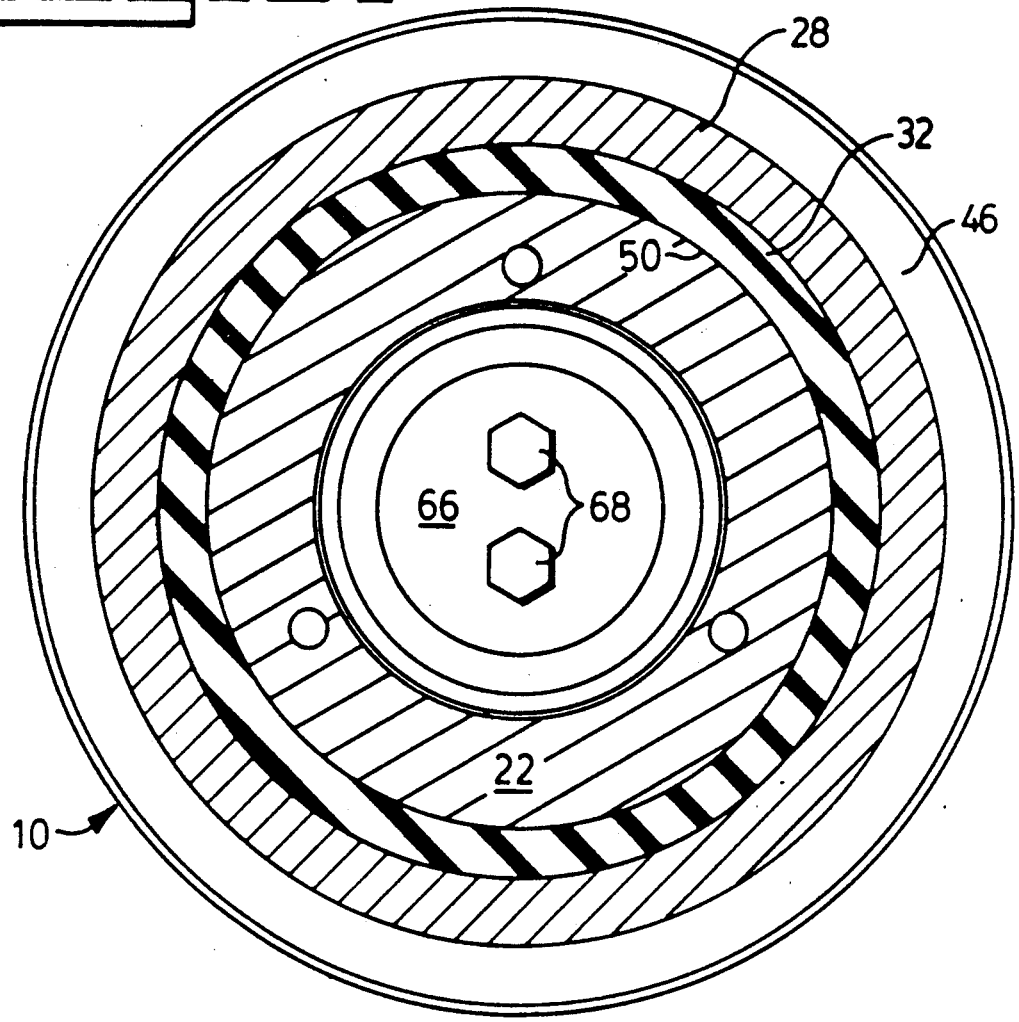
Fig_3_

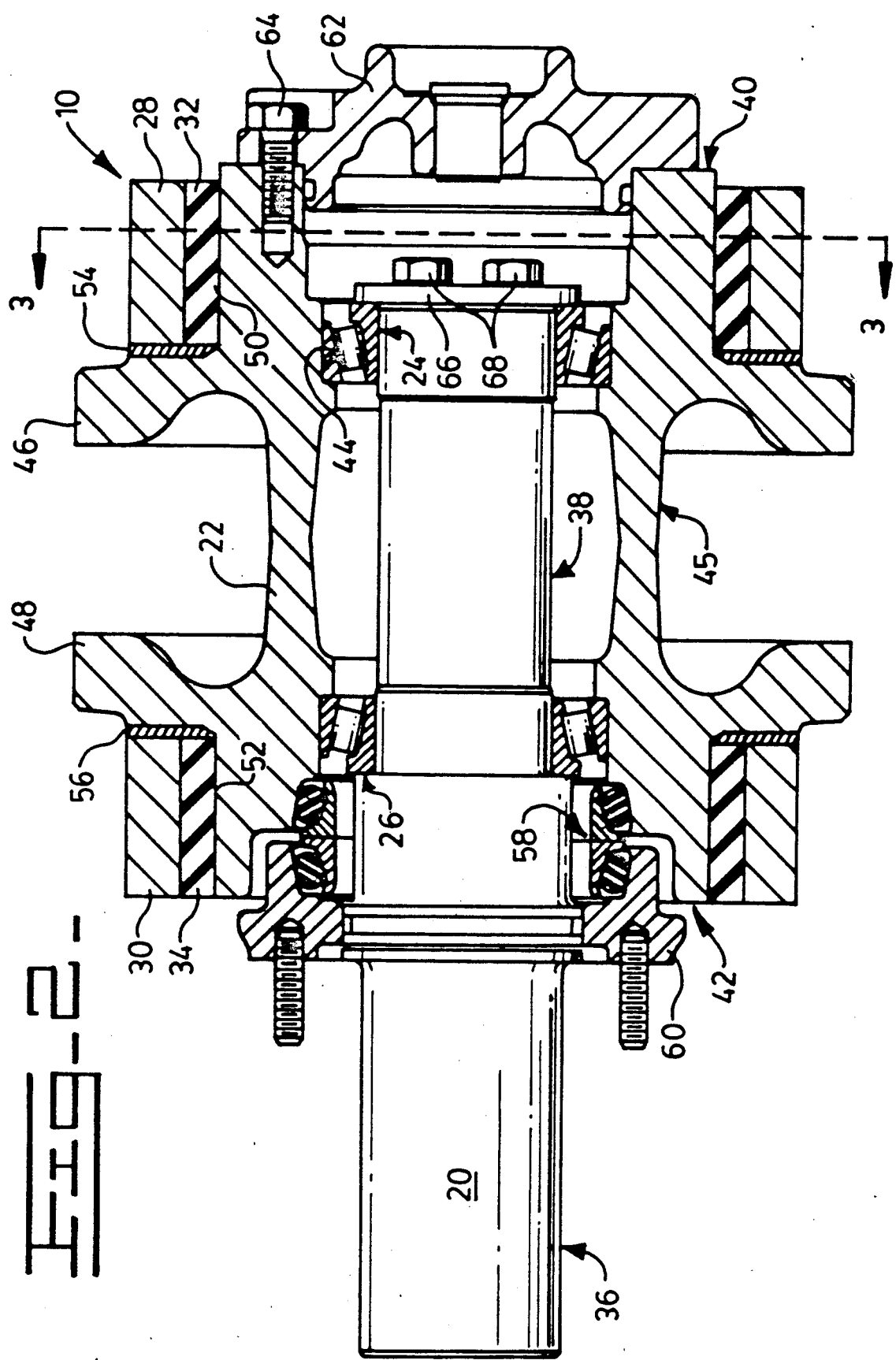

ISOLATED RIM ROLLER ASSEMBLY

TECHNICAL FIELD

This invention relates generally to track roller assemblies for supporting and guiding the endless track of a track-type vehicle and more particularly to a track roller assembly having a resiliently isolated rim portion for engaging portions of the endless track.

BACKGROUND ART

Self-laying track-type vehicles utilize an endless track chain assembly joined together by interconnected link assemblies. The link assemblies include overlapping link members which form a pair of continuous rails. Track guiding rollers and carrier rollers engage the rails as the chain assembly rotates about a drive sprocket wheel and one or more idler wheels.

One or more carrier rollers guide and support the upper portion of the track chain assembly between the idler wheel and the drive sprocket wheel. The carrier rollers generally rotate as the track link rails engage the rim portions of the rollers. Considerable noise and vibration is generated from the metal to metal engagement of the roller rims with the rails. This noise and vibrations are often magnified by other components of the vehicle.

One type of track roller having a replaceable rim and an elastic ring below the rim is disclosed in U.S. Pat. No. 3,580,093, issued on May 25, 1971, to K. Tomizawa. The replaceable rim is a metal ring and the elastic ring is made of rubber or synthetic resin. An end plate having an outer flange is secured to the roller hub and holds the rim and elastic ring in place. This arrangement requires the outer flanged plates to hold the rim and elastic ring in place.

Another type of track roller having a resilient mounted tread is disclosed in U.S. Pat. No. 3,910,128, issued on Oct. 7, 1975, to R. L. Boggs et al. The tread portion of this roller includes an inner resilient collar and an outer metallic ring. The tread portions are held between a pair of flanges and the flanges are secured in place by threaded retaining means. This particular arrangement would appear to function satisfactorily for its intended purpose. However, this assembly contains a considerable number of parts and requires time and effort to assemble the parts together.

The present invention is directed to overcoming one or more of the problems as set forth above.

DISCLOSURE OF THE INVENTION

In one aspect of the invention, an isolated rim roller assembly for guiding and supporting the endless track of a track-type vehicle includes a mounting shaft, a roller shell having first and second flange portions and first and second shoulder portions, first and second metallic rims encircling the first and second shoulder portions, first and second resilient non-metallic cushioning rings positioned between the first and second shoulder portions and the first and second rims, and first and second non-metallic washers positioned between the first rim and the first flange portion and between the second rim and the second flange portion.

In another aspect of the invention, an isolated rim roller shell for a track roller assembly is produced by the following process steps:

(1) providing a roller shell having first second end portions, first and second shoulder portions, and a central portion having radially extending flange portions, (2) placing the roller shell with the first end portion oriented in a vertical upright position and the first and second flange portions oriented in a horizontal position, (3) providing an organic plastic washer and positioning the washer over the first shoulder portion and in contact with the first flange portion, (4) providing a metallic rim and positioning the rim in contact with the washer and in spaced encircling relationship with the first shoulder portion, (5) providing a rubber substance in liquid form and applying the liquid substance in the space defined by the first shoulder portion, the metallic rim, and the plastic washer, (6) allowing the liquid rubber substance to solidify and bond to the first shoulder portion, to the metallic rim, and to the plastic washer, (7) re-positioning the roller shell with the second end portion oriented in a vertical position, and (8) repeating the process steps (3) through (6) with a second plastic washer and a second metallic rim.

Self-laying endless track vehicles, which are supported and propelled by steel track assemblies, generally utilize one or more track carrier rollers to guide and support the track assemblies between the driven sprocket wheel and the non-driven idler wheel. The carrier rollers have a pair of rim portions which engage the link rails of the track assembly. Bearings in the carrier roller assemblies provide rotation of the roller rims as a result of friction between the rims and the link rails. Because of the harsh environment in which the track vehicle operates, the carrier rollers often become covered with mud and foreign material. This material reduces the rollers' ability to freely rotate, and in some instances, the rollers stop rotating altogether. When this happens, the track links slide across the rollers, creating noise and rapid wear of the links and rollers.

Motion of the track in several places also produces impact loading on the carrier rollers. This impact loading generates considerable noise and causes structural damage to the rollers. When the rollers become worn or damaged, the vehicle must be removed from service while the worn parts are replaced or repaired.

The subject roller assembly provides a solution to the above noted problems by constructing a carrier roller having a resilient non-metallic ring which isolates the metal rim from the other components of the roller assembly. This reduces the noise, absorbs the impact loading, and prolongs the useful life of the roller assembly.

BRIEF DESCRIPTION OF THE DRAWINGS

FIG. 1 is a diagrammatic side elevational view of a track-type vehicle incorporating the isolated rim roller assembly of the present invention;

FIG. 2 is a diagrammatic sectional view, on an enlarged scale, of one of the roller assemblies of the present invention; and FIG. 3 is a diagrammatic sectional view taken generally along the lines 3—3 of FIG. 2.

BEST MODE FOR CARRYING OUT THE INVENTION

With reference to the drawings, an isolated rim roller assembly 10, for guiding and supporting portions of the endless tracks 12 between a drive wheel 14 and an idler wheel 16 of a track-type vehicle 18, includes a mounting shaft 20, a roller shell 22, first and second bearing assemblies 24,26, first and second metallic rims 28,30, and first and second resilient non-metallic cushioning rings 32,34. The mounting shaft 20 has a first end portion 36 for mounting to the vehicle 18, and a second roller supporting end portion 38. The roller shell 22 has first and second end portions 40,42, an axial throughbore 44, a central portion 45 having first and second radially extending flange portions 46,48, and first and second shoulder portions 50,52. The first and second bearing assemblies 24,26 are positioned between the roller shell axial throughbore 44 and the mounting shaft second end portion 38, and provide relative rotation between the shaft 20 and the roller shell 22.

The first and second metallic rims 28,30 encircle respectively the first and second shoulder portions 50,52 of the roller shell 22. The first and second cushioning rings 32,34 are positioned respectively between the first and second shoulder portions 50,52 and the first and second rims 28,30. The roller assembly 10 further includes first and second non-metallic organic plastic washers 54,56. These washers 54,56 are positioned respectfully between the first rim 28 and the first flange portion 46 and between the second rim 30 and the second flange portion 48. The first and second cushioning rings 32,34 are secured respectively, as by bonding, to the first and second shoulder portions 50,52, to the first and second rims 28,30, and to the first and second washers 54,56. Preferably, the cushioning rings 32,34 are formed of rubber. The roller assembly further includes a seal assembly 58 and a first retainer plate 60 associated with the second end portion 42 of the roller shell 22, and a cover plate 62 secured by a plurality of threaded fasteners 64 to the first end portion 40 of the roller shell 22. A second retainer plate 66 secured to the second end portion 38 of the shaft 20 hold the shaft 20 and roller shell 22 together.

The roller shell 22, having the plastic washers 54,56, the metallic rims 28,30, and the rubber cushioning rings 32,34 bonded thereto, is formed by a plurality of process steps. These process steps are preferably as follows:

(a) providing a roller shell 22 having first and second end portions 40,42, first and second shoulder portions 50,52, and a central portion 45 having first and second radially extending flange portions 46,48;

(b) placing the roller shell 22 with the first end portion 42 oriented in a substantially vertical upright position and the first and second flange portions 46,48 oriented in a substantially horizontal position;

(c) providing a first organic plastic washer 54 and positioning the washer 54 over the first shoulder portion 50 and in contact with the first flange portion 46;

(d) providing a first metallic rim 28 and positioning the rim 28 in contact with the washer 54 and in a spaced encircling relationship with the first shoulder portion 50;

(e) providing a resilient rubber substance in liquid form and applying the liquid rubber substance in a space defined by the first shoulder portion 50, the first metallic rim 28, and the first organic plastic washer 54;

(f) allowing the liquid rubber substance to solidify into a cushioning ring 32 and bond to the first shoulder portion 50, to the first metallic rim 28, and to the first organic plastic washer 54;

(g) repositioning the roller shell 22 with the second end portion 42 oriented in a substantially vertical upright position; and (h) repeating respectively the process steps (c) through (f) with a second organic plastic washer 56 and a second metallic rim 30 in conjunction with the second flange portion 48 and the second shoulder portion 52 of the roller shell second end portion 42.

The plastic washers 54,56 prevent the metallic rims 28,30 from bonding to the flange portions 46,48 of the roller shell 22. Bonding of the rims 28,30 to the flange portions 46,48 could produce high stresses in the cushioning rings 32,34 with a subsequent decrease in the useful life of the rings 32,34.

INDUSTRIAL APPLICABILITY

With reference to the drawings, the subject roller assembly 10 is particularly useful for reducing noise and impact levels between the roller assembly 10 and the link rails of the moving endless track 12 of a track-type vehicle 18. The link rails contact the metallic rims 28,30 as the track 12 and the roller assembly 10 rotate. The noise and impact generated by this metal to metal contact is not transferred into the remainder of the roller assembly 10, or other components of the vehicle 18, because of the cushioning rings 32,34. When the rims 28,30 become worn, they can be replaced without replacing the entire roller assembly 10.

Other aspects, objects, and advantages of the present invention can be obtained from a study of the drawings, the disclosure, and the appended claims.

I claim:

1. An isolated rim roller assembly for guiding and supporting the endless track of a track-type vehicle, comprising:

a mounting shaft having a first mounting end portion and a second roller supporting end portion;

a roller shell having first and second end portions, an axial throughbore, first and second radially extending flange portions, and first and second shoulder portions;

a plurality of bearing assemblies positioned between said roller shell axial throughbore and said mounting shaft second end portion;

first and second metallic rims encircling respectively said first and second shoulder portions;

first and second resilient non-metallic cushioning rings positioned respectively between said first and second shoulder portions and said first and second rims;

first and second non-metallic washers positioned respectfully between said first rim and said first flange portion and between said second rim and said second flange portion; and bonding said first and second cushioning rings respectively to said first and second shoulder portions, to said first and second rims, and to said first and second washers, said bonding being the sole force holding the cushioning rings on the roller shell.

2. A roller assembly, as set forth in claim 1, including a seal assembly and a retainer associated with said second end portion of said roller shell, and a cover plate secured to said first end portion of said roller shell.

3. A roller assembly, as set forth in claim 1, wherein said non-metallic cushioning rings are formed of rubber.

4. A roller assembly, as set forth in claim 1, wherein said non-metallic washers are formed of organic plastic.

5. A roller assembly, as set forth in claim 1, wherein said bonding of said first and second cushioning rings to said shoulder portions, to said rims, and to said washers includes forming said cushioning rings in place on said roller shell from a liquid substance and bonding said cushioning rings to said shoulder portions, to said rims, and to said washers as said liquid substance solidifies.

6. An isolated rim roller shell for a track roller assembly produced by the process steps of:
   (a) providing a roller shell having first and second end portions, first and second shoulder portions, and a central portion having first and second radially extending flange portions;
   (b) placing the roller shell with the first end portion oriented in a substantially vertical upright position and the first and second flange portions oriented in a substantially horizontal position;
   (c) providing a first organic plastic washer and positioning said washer over said first shoulder portion and in contact with said first flange portion;
   (d) providing a first metallic rim and positioning said rim in contact with said washer and in a spaced encircling relationship with said first shoulder portion;
   (e) providing a resilient rubber substance in liquid form and applying said liquid rubber substance in the space defined by said first shoulder portion, said first metallic rim, and said first organic plastic washer;
   (f) allowing said liquid rubber substance to solidify and bond to said first shoulder portion, to said first metallic rim, and to said first organic plastic washer, said solidified rubber substance forming a cushioning ring;
   (g) Re-positioning the roller shell with the second end portion oriented in a substantially vertical upright position; and
   (h) repeating respectively the process steps (c) through (f) with a second organic plastic washer and a second metallic rim in conjunction with the second flange portion and the second shoulder portion of said roller shell second end portion.

* * * * *